United States Patent
Yang et al.

(10) Patent No.: US 7,075,193 B2
(45) Date of Patent: Jul. 11, 2006

(54) POWER FACTOR CORRECTING CIRCUIT FOR UNINTERRUPTED POWER SUPPLY

(75) Inventors: Yong Yang, Shenzhen (CN); Chuandong Huang, Shenzhen (CN); Jianfei Li, Shenzhen (CN)

(73) Assignee: Emerson Network Power Co., Ltd., Shenzhen (CN)

(*) Notice: Subject to any disclaimer, the term of this patent is extended or adjusted under 35 U.S.C. 154(b) by 89 days.

(21) Appl. No.: 10/502,947

(22) PCT Filed: Jan. 28, 2003

(86) PCT No.: PCT/CN03/00091

§ 371 (c)(1),
(2), (4) Date: Sep. 30, 2004

(87) PCT Pub. No.: WO03/065539

PCT Pub. Date: Aug. 7, 2003

(65) Prior Publication Data

US 2005/0073860 A1    Apr. 7, 2005

(30) Foreign Application Priority Data

Feb. 1, 2002 (CN) .............................. 02 1 14835

(51) Int. Cl.
*H02J 7/00* (2006.01)
(52) U.S. Cl. .......................... 307/66; 307/46; 363/37; 363/89
(58) Field of Classification Search ............ 307/64–66, 307/44–48, 85–87; 363/16, 56, 63, 37, 44–48, 363/89, 124; 323/222, 271

See application file for complete search history.

(56) References Cited

U.S. PATENT DOCUMENTS 4,709,318 A * 11/1987 Gephart et al. ............... 363/37
4,719,550 A   1/1988 Powell et al. ................. 363/37

(Continued)

FOREIGN PATENT DOCUMENTS

CN    1336709    2/2002

*Primary Examiner*—Rajnikant B. Patel
(74) *Attorney, Agent, or Firm*—Morgan Lewis & Bockius LLP

(57) ABSTRACT

This invention relates to a PFC circuit for an uninterrupted power supply. Such a PFC circuit includes a first converter, a second converter, an energy storing branch composed of two capacitors in series, and a controller. Each of the first and the second converters has an input terminal and two output terminals. The input terminal is connected with the AC live wire of the commercial power, while the two output terminals of each converter are connected in parallel with the two ends of the energy storing branch, with the parallel joints acting as the output terminal of the positive and the negative voltages respectively. The common nod of the two capacitors in series serves as the common output terminal of the positive and the negative voltages, and it is connected with the neutral of the commercial power. By controlling the switch transistors of the first and the second converters, the controller allows the first and the second converters to output the positive and the negative DC voltages respectively, and brings the phase and the waveform of the input voltage of the commercial power and the current to be consistent with each other. The PFC circuit of the invention can be easily connected with a single battery or two batteries. It is capable of realizing AC-to-DC conversion, DC-to-AC conversion and power factor correction, and it is particularly suitable for using in the online UPS.

8 Claims, 5 Drawing Sheets

U.S. PATENT DOCUMENTS

| | | | |
|---|---|---|---|
| 4,823,247 A | | 4/1989 | Tamoto ........................ 363/16 |
| 4,866,587 A | * | 9/1989 | Wadlington .................. 363/16 |
| 5,736,841 A | * | 4/1998 | Gucyski ..................... 323/222 |
| 5,969,957 A | * | 10/1999 | Divan et al. ................... 363/36 |
| 6,069,412 A | | 5/2000 | Raddi et al. .................. 307/66 |
| 6,115,276 A | * | 9/2000 | Mao ........................... 363/127 |

* cited by examiner

POWER FACTOR CORRECTING CIRCUIT FOR UNINTERRUPTED POWER SUPPLY

TECHNICAL FIELD

The present invention relates to the power supply technology. More particularly, it relates to an improved power factor correction (PFC) circuit for an uninterrupted power supply (UPS).

BACKGROUND OF THE INVENTION

The high-frequency link technology has been widely used in various power supply applications. As shown in FIG. 1, a typical circuit construction of such an UPS includes three sections, i.e., the first section of an AC-DC converting circuit 10 for converting AC of the commercial power to DC, the second section of a DC-AC converting circuit 20 for converting DC to AC output, and the third section of a DC-DC converting circuit 30 for converting the voltage of the backup battery into the desired DC voltage. The circuit further includes energy storing elements C11 and C12, where the energy is stored to provide the inverter with the positive and negative voltages with respect to the neutral line. In case the power supplying condition of the commercial power falls within the predetermined permissible range, the commercial power provides the required energy to the entire device. The AC-DC converting circuit 10 allows the energy storing elements to store energy, and DC-AC converting circuit 20 provides high quality input of energy to a load. When the power supplying condition of the commercial power exceeds the range, or an interruption occurs, the energy is provided by the backup battery. DC-DC converting circuit 30 stores energy in the energy storing elements, while the DC-AC converting circuit 20 provides the load with uninterrupted energy supply. For the purpose of safety, usually the input naught line is directly connected to the output naught line. In addition, in order to reduce the power pollution of the UPS on the electric network, a typical AC-DC converting circuit 10 has the ability of power factor correction, and the circuit with such function can be referred to as power factor correction (PFC) circuit. Moreover, for reducing cost and simplifying the circuit construction, it is desired that the first section and the third section can be combined together.

Recently, a number of PFC circuits for UPS have been proposed. For instance in U.S. Pat. No. 4,719,550 entitled "Uninterrupted Power Supply with Energy Conversion and Enhancement", a half-bridge high-frequency rectifier circuit is disclosed, the principle of which is shown in FIG. 2. By turning on and off Q21 and Q22, the positive and negative voltages can be obtained on the capacitors C21 and C22, while the waveform and the phase of the input current and input voltage are consistent with each other. However, a drawback of this circuit lies in that Q21 and Q22 cannot be turned on the same time, otherwise Q21 and Q22 will cause a short circuit current between the capacitors C1 and C2, thereby generating a large short circuit current in the system. Another drawback is that another converting circuit has to be used for connecting the battery, as illustrated in FIG. 4, which in turn increases the size and the weight of the system and deteriorates the reliability of the system.

In U.S. Pat. No. 6,069,412 entitled "Power Factor Corrected UPS with Improved Connection of Battery to Neutral", a PFC circuit of a boost circuit style is disclosed, the principle of which is illustrated in FIG. 3. The basic topology of the PFC circuit is a boost circuit, and the boost and PFC functions are realized by turning on and turning off Q31 and Q32.

There are various methods of connecting the battery in such a circuit. FIG. 5 shows a simple method, whereby the battery is connected to the PFC circuit through a switch S51 and diodes D55, D56 and D57, and the voltage of the battery is boosted to the positive bus voltage and the negative bus voltage through two converters respectively. A shortage of this circuit is that it is complicated because too many power diodes are needed for connecting the battery.

SUMMARY OF THE INVENTION

The technical problem for the present invention to solve is to provide an improved power factor correction circuit for an uninterrupted power supply to overcome the above-mentioned disadvantages of the UPS technology in the prior art. Such a PFC circuit is capable of realizing AC-DC conversion, DC-DC conversion and power factor correction.

The aforesaid objects of the present invention are realized by providing a power factor correction circuit for an uninterrupted power supply that comprises an energy storing branch composed of a first capacitor and a second capacitor in serial. The PFC circuit is characterized by further comprising a first converter composed of a first inductor, a first switch transistor and a first rectifier element for converting a given positive voltage to a desired positive DC voltage, a second converter composed of a second inductor, a second switch transistor and a second rectifier element for converting a given negative voltage to a desired negative DC voltage. Each of the first and the second converters has an input terminal and two output terminals, with the input terminal connected to the live wire of an AC power supply and the two output terminals connected to the two ends of the energy storing circuit respectively. The parallel joints of the three serve as the output terminals of the positive and negative voltages. The common nod of the two capacitors in series acts as the common output terminal of the positive and the negative voltages, and it is connected with the naught wire of the commercial power. The PFC circuit further includes a controller for controlling the switch transistors of the first and the second converters to turn them on or off, thereby having the input current of the live wire accord to the phase and the waveform of the input voltage.

The power factor correction circuit for an uninterrupted power supply of the present invention further comprises isolators placed between the AC live wire of the commercial power and the first and the second converters for preventing the battery from releasing energy in the direction to the alternating current of the commercial power. The isolators divide the live wire of the commercial power into a first and a second branch that are connected with the input terminals of the first and the second converters respectively. In the embodiment of the present invention, a diode is used as the isolator. However, a thyristor can be used as well.

In the power factor correction circuit for an uninterrupted power supply of the present invention, an end of the respective rectifier elements of the first and the second converters are the output terminals of the first and the second converters that are connected with the output terminals of the positive and the negative voltages, while the other end thereof form the other output terminals of the first and second converters through the respective switch transistors, and are connected with the output terminals of the positive and the negative voltages, and form the input terminals of the first and the second converters through respective energy storing inductors and are connected with the first and the second branches.

The power factor correction circuit for an uninterrupted power supply of the present invention has a battery (e.g., a backup battery) connected thereto and a switch. One end of the battery connects to the input terminal of a converter through the switch, while the other end connects the naught wire. The power factor correction circuit further has a diode connected thereto and a switch. One end of the diode connects to the naught wire, while the other end connects, through the switch, to the input terminal of the other converter.

The power factor correction circuit for an uninterrupted power supply of the present invention has a simple circuit construction, and it can be easily connected with the battery. It is capable of realizing AC-DC conversion, DC-AC conversion and power factor correction, and it is particularly suitable for using in the online UPS.

DETAILED DESCRIPTION OF THE INVENTION

Figure 1:
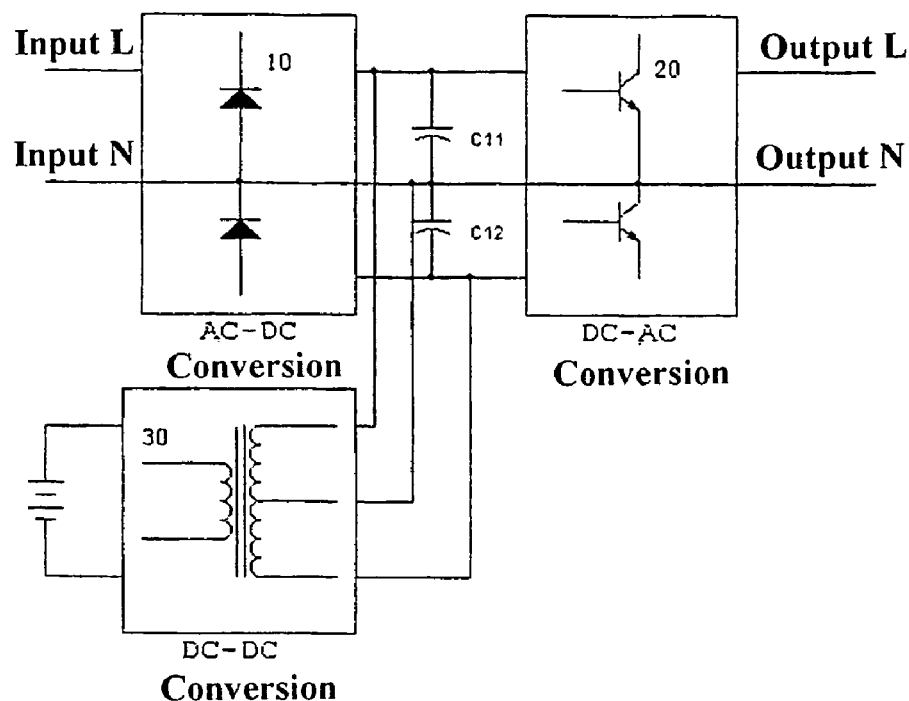
FIG. 1 is a schematic diagram of an online UPS in the prior art.
Figure 2:
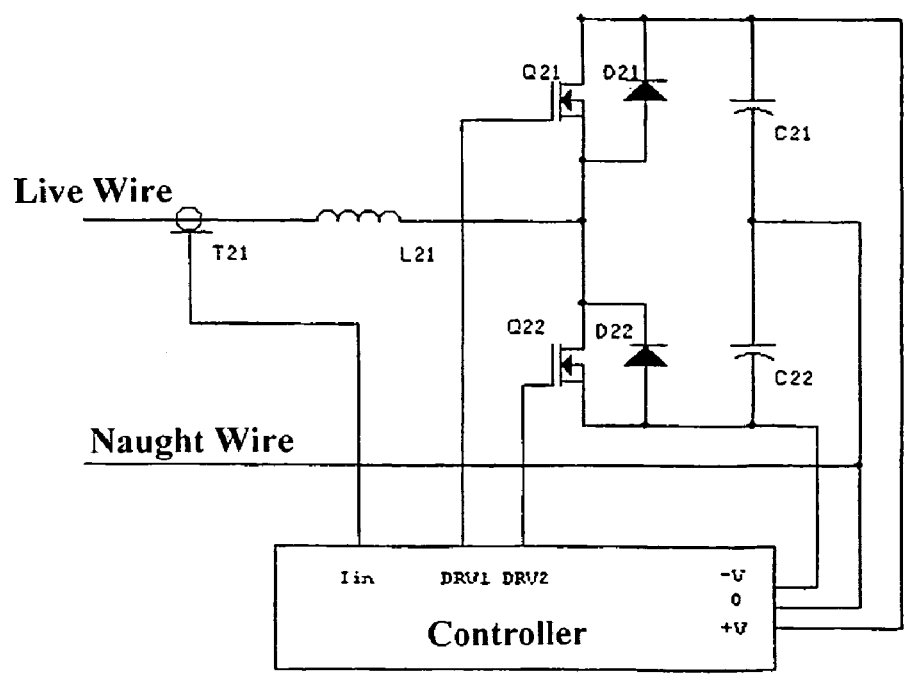
FIG. 2 is a schematic diagram of a half-bridge high-frequency rectifier PFC circuit in the prior art.
Figure 3:
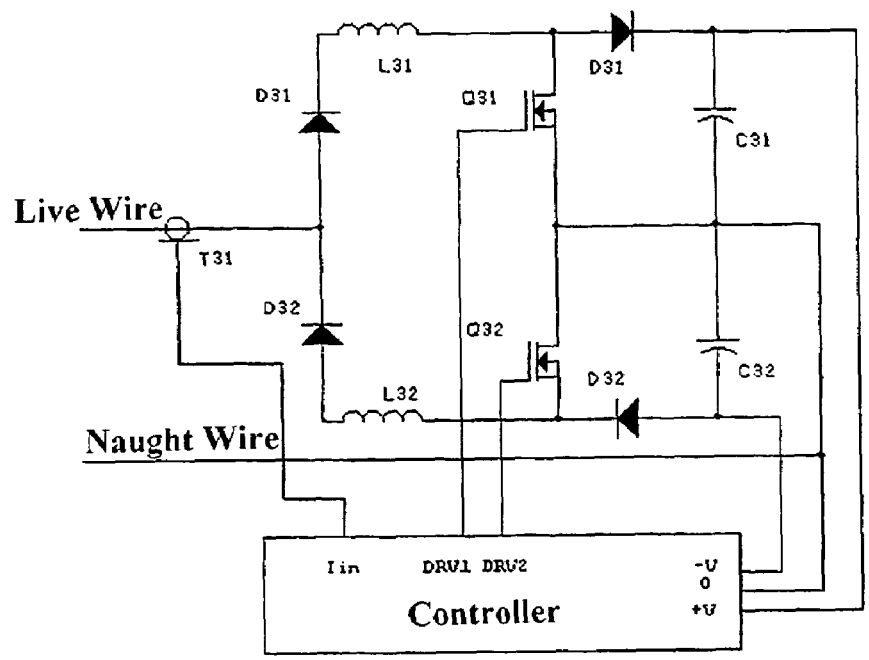
FIG. 3 is a schematic diagram of a PFC circuit of the boost circuit style in the prior art.
Figure 4:
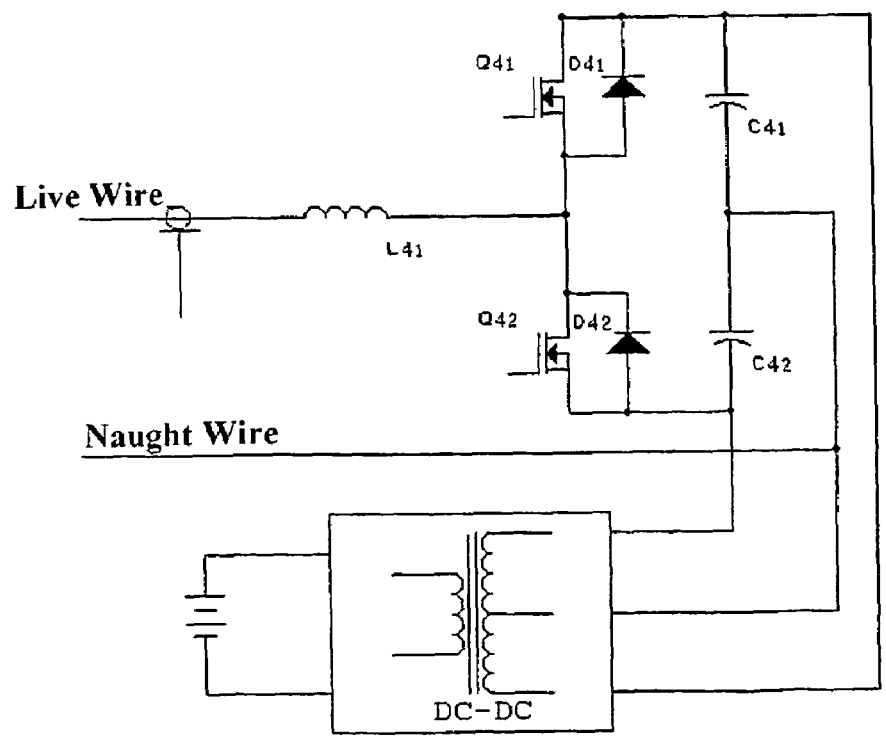
FIG. 4 is a schematic diagram showing the circuit in FIG. 2 connected with a battery.
Figure 5:
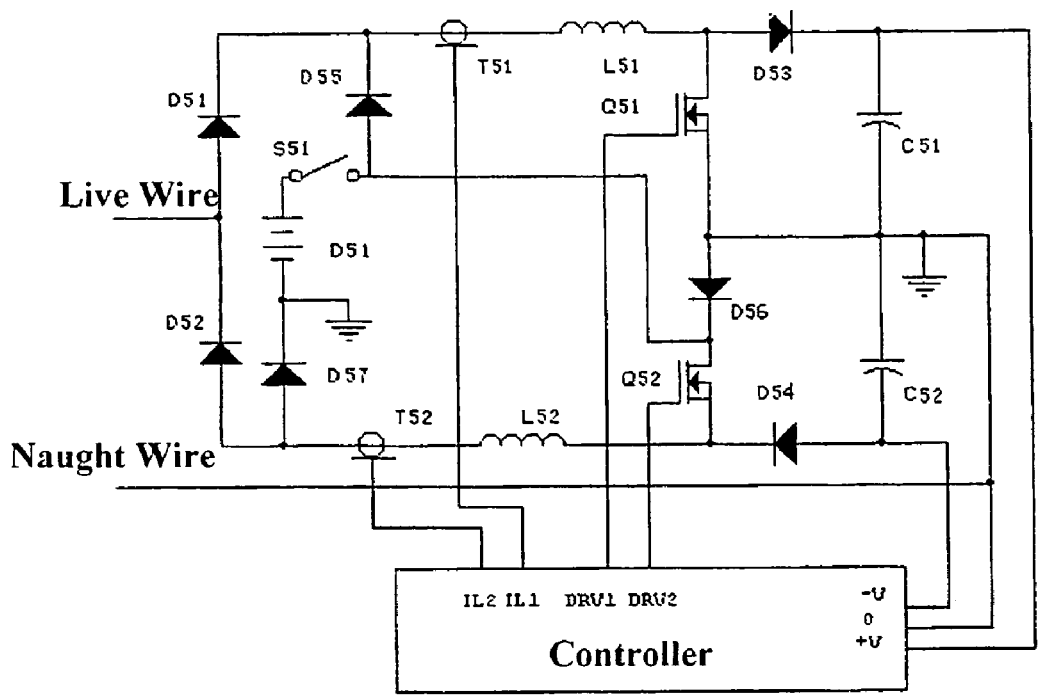
FIG. 5 is a schematic diagram showing the circuit in FIG. 3 connected with a battery.

The operating principle of the power factor correction circuit for an uninterrupted power supply in accordance with the present invention is similar to that of the half-bridge high-frequency rectifier circuit. In the half-bridge high-frequency rectifier circuit of FIG. 2, the input from the commercial power is a 50 Hz or 60 Hz sine wave. When the input of the commercial power is at the positive half cycle, the capacitor 21 is charged through D21 and Q22. During the negative half cycle of the commercial power, the capacitor 22 is charged through D22 and Q21. As can be seen from the operating principle, Q21, Q22, D21 and D22 work at different time intervals during the AC-DC conversion. Hence, two separate converters can be obtained if the inductor is divided into two inductors.

Figure 6:
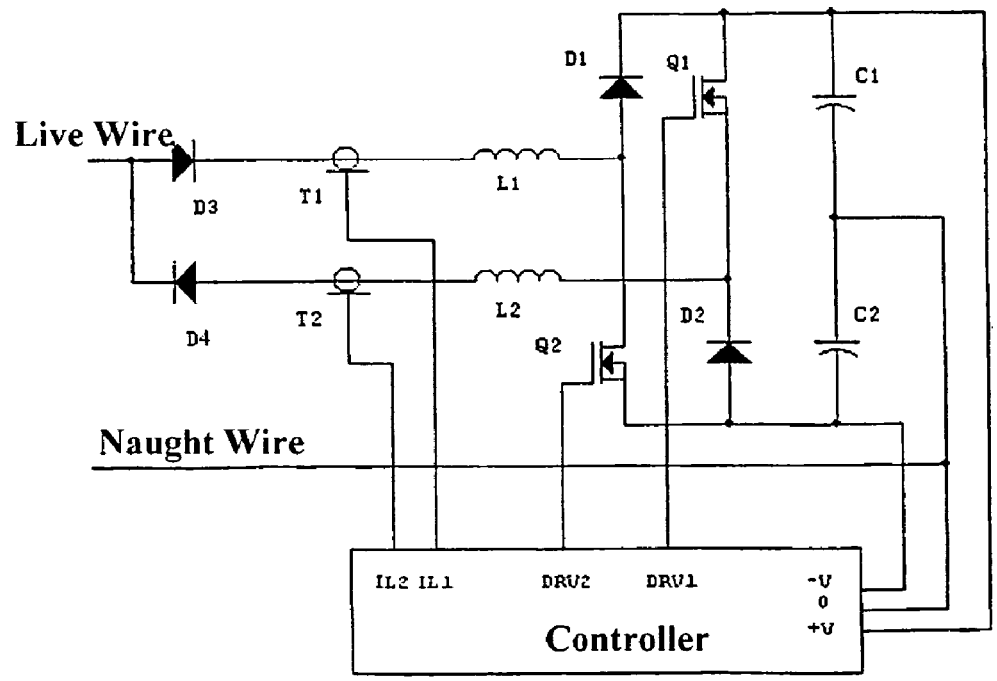
FIG. 6 is a schematic diagram of a PFC circuit in accordance with a preferred embodiment of the present invention.

FIG. 6 illustrates the principle of a PFC circuit of a preferred embodiment in accordance with the present invention. The output terminals of the circuit are connected to the live wire and naught wire respectively. The circuit outputs two DC voltages having approximately equal amplitudes, and the common terminal is directly connected to the input naught wire.

In general, the input voltage from the input end is a sine wave AC signal with low frequency, for example, 50 Hz or 60 Hz. However, the operating frequency of the switches is relatively high, that is typically 20 KHz. The diodes D3 and D4 rectify the commercial power, thereby obtaining the two positive and negative pulsation DC voltages.

During the positive half cycle of the commercial power, turning-on and turning-off of the control switch transistor Q2 generate a stable voltage on the capacitor C1, which is typically 380V. The following is the detailed operation. When Q2 is turned on, the voltage of the commercial power and the voltage of the negative bus are superposed to charge the inductor L1, thereby increasing the current in the inductor L1, and the commercial power source and the negative bus capacitor store energy in the inductor L1. When Q2 is turned off, the inductor L1 sustains current through diode D1. Since the voltage on the capacitor C1 is higher than that of the input AC power supply, the current in the inductor L1 is reduced. Therefore, the energy in the inductor is transferred to the capacitor C1. During this process, the commercial power continues to transfer energy to the capacitor C1.

When the voltage of the commercial power is at the negative half cycle, turning-on and turning-off of the control switch transistor Q1 generate a stable voltage on the capacitor C2, which is also typically 380V. The detailed operation is as follows: when Q1 is turned on, the voltage of the commercial power and the voltage of the positive bus are superposed to charge the inductor L2, thereby increasing the current in the inductor L2, and the commercial power source and the negative bus capacitor store energy to the inductor L2, and when Q1 is turned off, the inductor L2 sustains current through diode D2. Since the absolute value of the voltage on the capacitor C2 is higher than the absolute value of the voltage of the input AC power supply, the current in the inductor L2 is reduced. Therefore, the energy in the inductor is transferred to the capacitor C2. During this process, the commercial power continues to transfer the energy to the capacitor C2.

In the power factor correction circuit for an uninterrupted power supply in accordance with the present invention, the controller comprises signal acquisition devices T1 and T2 for collecting the input voltage and current from the inductors L1 and L2 that are connected with the respective input terminals of the inductors L1 and L2 in the first and the second converters. The controller is connected with the control electrodes of the switches Q2 and Q1 of the first and the second converters to output corresponding control signals to the control electrodes of the switches for controlling the switches Q2 and Q1 to turn on and off.

As can be seen, the diodes D3 and D4 rectify the commercial power, thereby obtaining the two positive and negative pulsation DC voltages. The positive voltage is boosted by L1, D1 and Q2, and a stabilized positive bus voltage is obtained. The negative voltage is boosted by L2, D2 and Q1, and a stabilized negative bus voltage is obtained. The two stabilized bus voltages are provided to the converter for DC-AC conversion.

The bus voltages +V and −V are collected into the controller, and the current and the induction of the inductors L1 and L2 are collected by the signal acquisition devices into the controller. The acquisitions are controlled such that the current in the input live wire is regulated to be consistant with the waveform and the phase of the input voltage, thereby realizing the function of the power factor correction.

The power factor correction circuit for an uninterrupted power supply in accordance with the present invention further includes isolators disposed between the live wire of the commercial power and the first and second converters respectively for preventing the direct current of the battery (e.g., the backup battery) from releasing energy to the alternating current of the commercial power. In the power factor correction circuit, the live wire of the commercial power is divided by the isolators into the first and the second branches, which are connected with the input terminals of the first and the second converters respectively. In the embodiment of the present invention, diodes D3 and D4 act as the isolators. As illustrated in FIG. 6, a forward diode D3 is placed between the live wire of the commercial power and the input terminal of the first converter, while a backward diode is placed between the live wire of the commercial power and the input terminal of the second converter. The diodes D3 and D4 are not indispensable in the PFC circuit although they can provide advantages for the connection with batteries. In practice, they can be replaced with thyristors.

Figure 7:
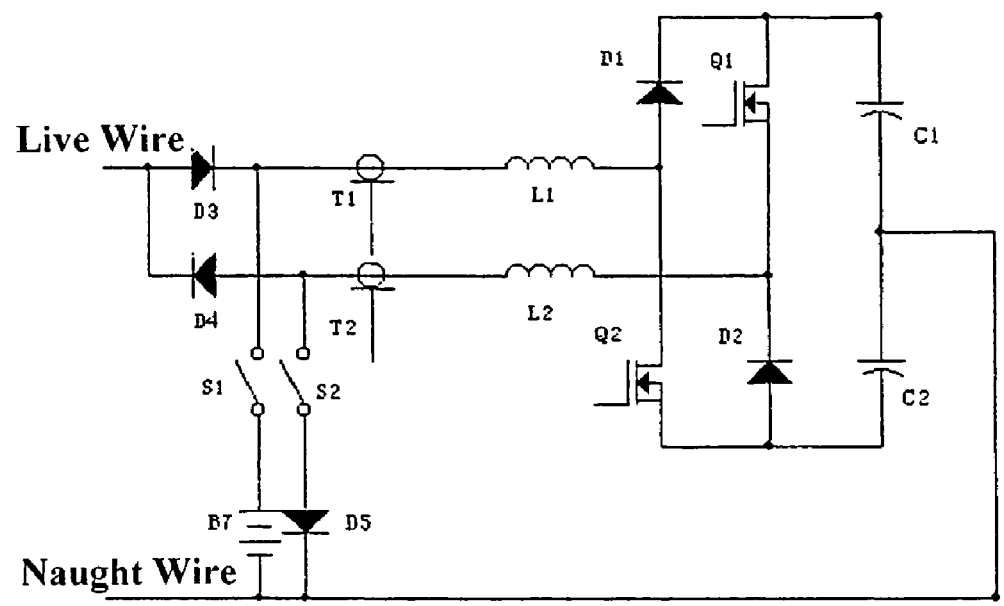
FIG. 7 is a schematic diagram showing the PFC circuit in FIG. 6 connected with a single battery.

FIG. 7 shows one of the methods for connecting a battery (e.g., a backup battery) in accordance with the present invention. With this method, the anode of the battery B7 is connected between the D3 and the L1 of the first branch of the live wire through a switch S1, while the cathode is connected to the naught wire. The naught wire is also connected between the D4 and the L2 of the second branch of the live wire through a switch S2 and a diode D5. The switch S2 and the diode D5 herein can be replaced with thyristors as well. When the commercial power condition does not meet the predetermined requirement or the commercial power is lost, the input of the commercial power is disconnected from the input of the converter and the switches S1 and S2 are turned on, thereby connecting the battery to the circuit. Thus, the battery can provide the converter with energy and power the load. The operation is as follows: when the switch transistor Q2 is turned on, the voltage of the battery and the voltage of the negative bus of the capacitor C2 are superposed to charge the inductor L1, thereby increasing the current and storing energy in the inductor L1, and when the switch transistor Q2 is turned off, the inductor L1 sustains current through diode D1. Since the voltage on the capacitor C1 is higher than that of the battery, the current in the inductor L1 is reduced. Thus, the energy in the inductor is transferred to the capacitor C1. During this process, the battery continues to transfer energy to the capacitor C1. The voltage of the battery can provide the positive bus with energy through this converter.

In addition, when the switch S2 is switched on, Q1, D2 and D5 form a Buck-Boost circuit. When Q1 is turned on, the capacitor C1 charges the inductor L2 through Q1, thereby storing energy and increasing the current in the inductor L2. When Q1 is turned off, the inductor L2 sustains current through the diodes D2 and D5, and the energy in the inductor is transferred to C2, thereby charging C2. The voltage on C2 can be stabilized within the predetermined range by controlling the switch duty ratio of the switch transistor Q1. This converter can convert the positive bus voltage to the negative bus voltage.

As illustrated in FIG. 7, the diodes D3 and D4 are used for preventing the battery from releasing energy in another direction. The battery B1 can also be connected to the input side of the inductor in the negative boost circuit, while the positive boost circuit and the diodes added form a Buck-Boost circuit.

Figure 8:
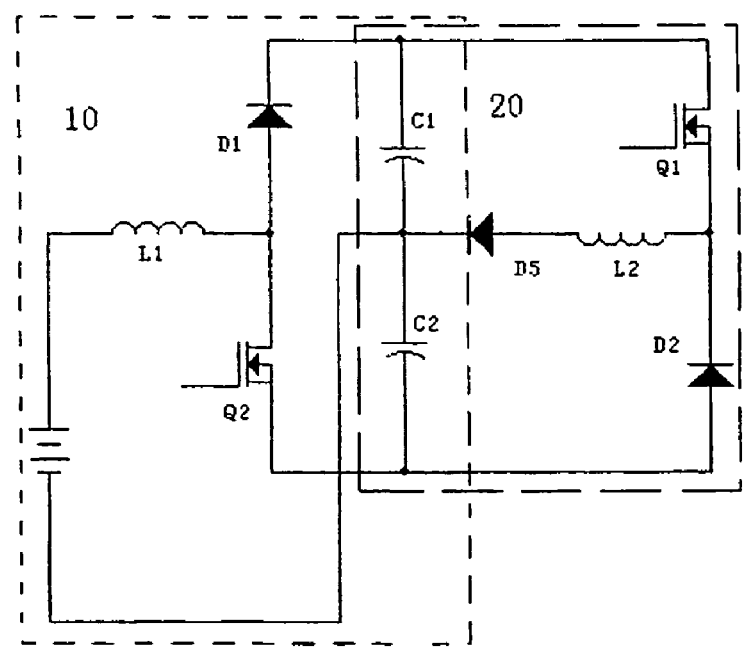
FIG. 8 is the simplified illustrative diagram of the circuit in FIG. 7.

FIG. 8 is a simplified diagram of FIG. 7, and can show relatively clear about the two converter circuits. In the embodiment of the present invention, the first converter circuit is the boost converter circuit of the positive bus that is indicated as block 810. The second converter circuit is the boost converter circuit of the negative bus that is indicated as block 820.

Figure 9:
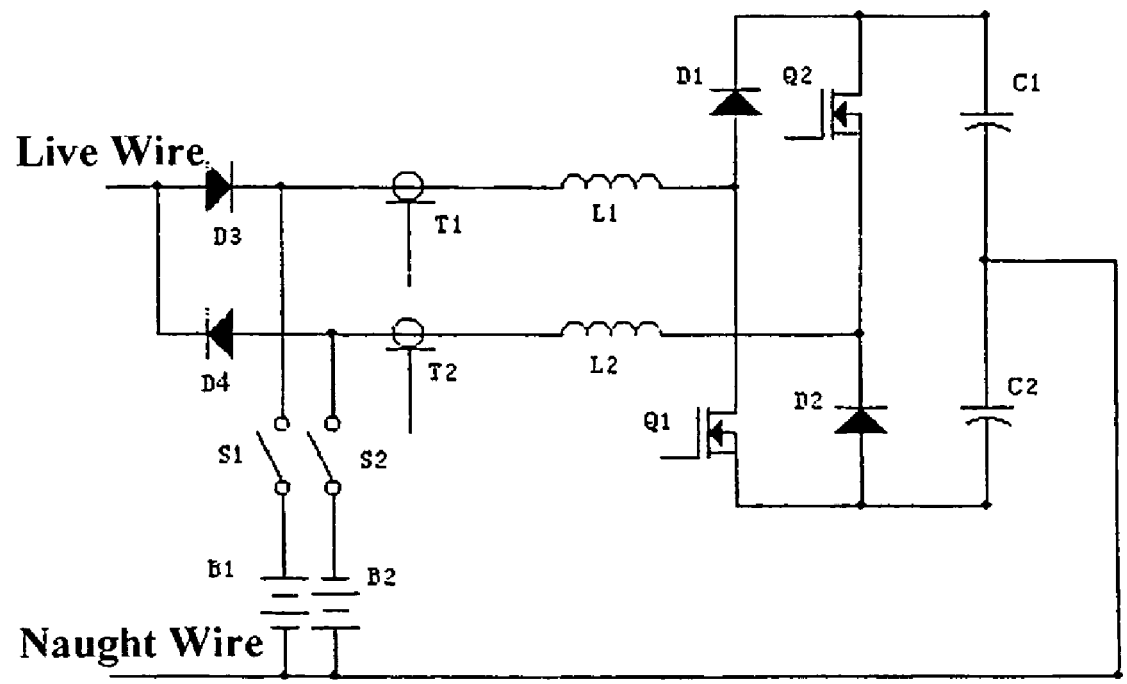
FIG. 9 is a schematic diagram showing the PFC circuit in FIG. 6 connected with two batteries.

FIG. 9 shows another method for connecting the battery, wherein a group of batteries are connected to the input side of the inductor in the positive boost circuit for boosting the voltage of the batteries to positive bus voltage, and another group of batteries are connected to the input side of the inductor in the negative boost circuit for boosting the voltage of the negative batteries to negative bus voltage. The operation process is similar to that in FIG. 7, and thus omitted herein.

While the present invention is described in connection with the above embodiment, it will be obvious to those skilled in the art that many modifications and variations are possible that are still within the spirit and the scope of the invention.

The invention claimed is:

1. A power factor correction circuit for an uninterrupted power supply, comprising an energy storing branch composed of a first capacitor and a second capacitor in serial, characterized by comprising a first converter having a first inductor, a first switch transistor and a first rectifier element for converting a given positive voltage to a desired positive DC voltage, a second converter having a second inductor, a second switch transistor and a second rectifier element for converting a given negative voltage to a desired negative DC voltage;

each of said first and second converters having an input terminal and two output terminals, with said input terminal of each converter connected to the live wire of an AC power supply, said two output terminals connected to the two ends of said energy storing circuit respectively, and the parallel joints of the three acting as output terminals of positive and negative voltages; a common nod of the two capacitors in series of said energy storing branch acting as a common output terminal of positive and negative voltages and connected with the naught wire of said AC power supply; and a controller for controlling the switch transistors of said first and second converters to turn on and off, thereby allowing the input current in the live wire to be consistent with the phase and the waveform of the input voltage.

2. The power factor correction circuit for an uninterrupted power supply of claim 1, characterized by further comprising a backup battery and an isolator for preventing said battery from releasing energy to said AC power supply, said isolator dividing the live wire of said AC power supply into a first branch and a second branch, said first branch connected to the input terminal of said first converter, and said second branch connected to the output terminals of said second converter.

3. The power factor correction circuit for an uninterrupted power supply of claim 2, characterized in that the rectifier element in said first converter is a first diode (D1) that forms said first converter along with said first inductor (L1) and said first switch transistor (Q2), wherein the cathode of said first diode (D1) is connected with the output terminal of said positive voltage, and the anode of said first diode is connected with the output terminal of said negative voltage through said first switch transistor (Q2) and connected with said first branch through said first inductor (L1); the rectifier element in said second converter being a second diode (D2) that forms said second converter along with said second inductor (L2) and said second switch transistor (Q1), wherein the anode of said second diode (D2) is connected with the output terminal of said negative voltage, and the cathode of said second diode is connected with the output terminal of said positive voltage through said second switch tube (Q1) and connected with said second branch through said second inductor (L2).

4. The power factor correction circuit for an uninterrupted power supply of claim 1, characterized in that said controller is connected with a first and a second signal acquisition devices and outputs corresponding signals according to the input voltage and current of said first and second inductors collected by the first and the second signal acquisition devices into the control electrode of said first and second switch transistors.

5. The power factor correction circuit for an uninterrupted power supply of claim 2, characterized in that the anode of said backup battery is connected to the input terminal of said first inductor through the first switch (S1), and the cathode of said backup battery is connected to the input terminal of the naught wire of said AC power supply; a first backup diode having a cathode connected to the input terminal of the naught wire of said AC power supply and an anode connected to the input terminal of said second inductor through the second switch (S2).

6. The power factor correction circuit for an uninterrupted power supply of claim 2, characterized in that the cathode of said backup battery is connected to the input terminal of said second inductor through the second switch (S2), and the anode of said backup battery is connected to the input terminal of the naught wire of said AC power supply; a second backup diode having an anode connected to the input terminal of the naught wire of said AC power supply and a cathode connected to the input terminal of said first inductor through the first switch (S1).

7. The power factor correction circuit for an uninterrupted power supply of claim 2, characterized in that said backup battery comprises a first battery and a second battery, the anode of said first battery is connected to the input terminal of said first inductor through the first switch (S1), and the cathode of said first battery is connected to the input terminal of the naught wire of said AC power supply; the cathode of said second battery being connected to the input terminal of said second inductor through the second switch (S2), and the anode of said second battery connected to the input terminal of the naught wire of said AC power supply.

8. The power factor correction circuit for an uninterrupted power supply of claim 2, characterized in that said isolator comprises a third diode and a fourth diode, said third diode being a forward diode placed in series between the live wire of said AC power supply and the input terminal of said first inductor, said fourth diode being a backward diode placed in series between the live wire of said AC power supply and the input terminal of said second inductor.

* * * * *